(12) United States Patent
Ling et al.

(10) Patent No.: US 6,461,696 B1  
(45) Date of Patent: *Oct. 8, 2002

(54) MULTI-LAYERED POLYMER BASED MOISTURE BARRIER STRUCTURE FOR MEDICAL GRADE PRODUCTS

(75) Inventors: Michael T. K. Ling, Vernon Hills; Lecon Woo, Libertyville; Robert Wojnarowski, Zion; Ketan Shah, Gurnee, all of IL (US); Gregg Nebgen, Burlington, WI (US); Yuan-pang Samuel Ding, Vernon Hills, IL (US); Varsha Kalyankar, Round Lake Beach, IL (US); Keith M. K. Anderson, Libertyville, IL (US); Lillian G. Zakarija, Chicago, IL (US); Colleen S. Cramer, Racine, WI (US); Michael Scharf, McHenry; Larry A. Rosenbaum, Gurnee, both of IL (US)

(73) Assignee: Baxter International Inc., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/498,674

(22) Filed: Feb. 7, 2000

Related U.S. Application Data (63) Continuation-in-part of application No. 09/334,957, filed on Jun. 17, 1999, now Pat. No. 6,621,655, which is a continuation of application No. 08/153,602, filed on Nov. 16, 1993, now Pat. No. 5,998,019.

(51) Int. Cl.⁷ .................. B32B 27/08; B32B 27/30; B32B 27/32; B32B 27/34; B32B 27/40

(52) U.S. Cl. .................. 428/34.5; 428/36.6; 428/36.7; 428/355 AK; 428/355 EN; 428/355 BL; 428/355 CN; 428/355 AC; 428/355 N; 428/515; 428/516; 428/517; 428/519; 428/520; 428/521; 428/522; 428/523; 428/424.2; 428/424.8; 428/476.3; 428/476.9; 525/66; 525/88; 525/92 R; 525/92 B; 525/93; 525/95; 525/96; 525/178; 525/185; 525/191; 525/222; 525/240; 525/241

(58) Field of Search .............................. 428/34.5, 36.6, 428/36.7, 355, 515, 516, 520, 523, 519, 355 AK, 355 EN, 355 BL, 355 AC, 355 N, 355 CN, 475.8, 476.1, 476.3, 476.9, 522, 517, 521, 424, 424.8; 525/88, 66, 92 R, 92 B, 93, 95 J, 95, 96, 178, 185, 191, 222, 240, 241

(56) References Cited

U.S. PATENT DOCUMENTS

| | | |
|---|---|---|
| 2,705,223 | 3/1955 | Renfrew et al. |
| 3,255,923 | 6/1966 | Soto |
| 3,375,300 | 3/1968 | Ropp |
| 3,772,136 | 11/1973 | Workman |
| 3,912,843 | 10/1975 | Brazier |
| 3,937,758 | 2/1976 | Castagna |
| 3,995,084 | 11/1976 | Berger et al. |
| 4,041,103 | 8/1977 | Davison et al. |
| 4,058,647 | 11/1977 | Inoue et al. |
| 4,087,587 | 5/1978 | Shida et al. |
| 4,087,588 | 5/1978 | Shida et al. |
| 4,095,012 | 6/1978 | Schirmer |
| 4,147,827 | 4/1979 | Breidt, Jr. et al. |
| 4,230,830 | 10/1980 | Tanny et al. |
| 4,233,367 | 11/1980 | Ticknor et al. |
| 4,311,807 | 1/1982 | McCullough et al. |
| 4,322,465 | 3/1982 | Webster |
| 4,322,480 | 3/1982 | Tuller et al. |
| 4,327,726 | 5/1982 | Kwong |
| 4,332,655 | 6/1982 | Berejka |
| 4,387,184 | 6/1983 | Coquard et al. |
| 4,405,667 | 9/1983 | Christensen et al. |
| 4,407,877 | 10/1983 | Rasmussen |
| 4,407,888 | 10/1983 | Crofts |
| 4,417,753 | 11/1983 | Bacebowski et al. |
| 4,429,076 | 1/1984 | Saito et al. |

| | | | | | | |
|---|---|---|---|---|---|---|
| 4,479,989 | 10/1984 | Mahal | | 5,176,956 | 1/1993 | Jevne et al. |
| 4,521,437 | 6/1985 | Storms | | 5,183,706 | 2/1993 | Bekele |
| 4,548,348 | 10/1985 | Clements | | 5,185,189 | 2/1993 | Stenger et al. |
| 4,562,118 | 12/1985 | Maruhashi et al. | | 5,189,091 | 2/1993 | Laughner |
| 4,568,723 | 2/1986 | Lu | | 5,194,316 | 3/1993 | Horner et al. |
| 4,588,648 | 5/1986 | Krueger et al. | | 5,196,254 | 3/1993 | Akiyama |
| 4,599,276 | 7/1986 | Martini | | 5,206,290 | 4/1993 | Mizuno et al. |
| 4,627,844 | 12/1986 | Schmitt | | 5,212,238 | 5/1993 | Schelbelhoffer et al. |
| 4,636,412 | 1/1987 | Field | | 5,218,048 | 6/1993 | Abe et al. |
| 4,640,870 | 2/1987 | Akazawa et al. | | 5,230,934 | 7/1993 | Sakano et al. |
| 4,643,926 | 2/1987 | Mueller | | 5,230,935 | 7/1993 | Delimoy et al. |
| 4,686,125 | 8/1987 | Johnston et al. | | 5,238,997 | 8/1993 | Bauer et al. |
| 4,692,361 | 9/1987 | Johnson et al. | | 5,244,971 | 9/1993 | Dekoninck |
| 4,707,389 | 11/1987 | Ward | | 5,258,230 | 11/1993 | LaFleur et al. |
| 4,724,028 | 2/1988 | Zabielski et al. | | 5,278,231 | 1/1994 | Chundury |
| 4,726,997 | 2/1988 | Mueller et al. | | 5,288,799 | 2/1994 | Schmid et al. |
| 4,732,795 | 3/1988 | Ohya et al. | | 5,290,856 | 3/1994 | Okamoto et al. |
| 4,734,327 | 3/1988 | Vicik | | 5,306,542 | 4/1994 | Bayer |
| 4,735,855 | 4/1988 | Wofford et al. | | 5,312,867 | 5/1994 | Mitsuno et al. |
| 4,740,582 | 4/1988 | Coquard et al. | | 5,317,059 | 5/1994 | Chundury et al. |
| 4,753,222 | 6/1988 | Morishita | | 5,342,886 | 8/1994 | Glotin et al. |
| 4,760,114 | 7/1988 | Haaf et al. | | 5,348,794 | 9/1994 | Takahashi et al. |
| 4,764,404 | 8/1988 | Genske et al. | | 5,356,676 | 10/1994 | von Widdern et al. |
| 4,767,651 | 8/1988 | Starczewski et al. | | 5,371,141 | 12/1994 | Gelles et al. |
| 4,772,497 | 9/1988 | Maasola | | 5,378,543 | 1/1995 | Murata et al. |
| 4,778,697 | 10/1988 | Genske et al. | | 5,378,800 | 1/1995 | Mok et al. |
| 4,792,488 | 12/1988 | Schirmer | | 5,387,645 | 2/1995 | Montag et al. |
| 4,795,782 | 1/1989 | Lutz et al. | | 5,686,527 | 11/1997 | Laurin et al. ............... 525/66 |
| 4,800,129 | 1/1989 | Deak | | 5,733,619 | 3/1998 | Patel et al. ............. 428/36.91 |
| 4,803,102 | 2/1989 | Raniere et al. | | 5,849,843 | 12/1998 | Laurin et al. ............... 525/66 |
| 4,834,755 | 5/1989 | Silvestrini et al. | | 5,854,347 | 12/1998 | Laurin et al. ............... 525/66 |
| 4,855,356 | 8/1989 | Holub et al. | | 5,935,847 | 8/1999 | Smith et al. ............. 435/297.5 |
| 4,856,259 | 8/1989 | Woo et al. | | 5,993,949 | 11/1999 | Rosenbaum et al. ........ 428/213 |
| 4,856,260 | 8/1989 | Woo et al. | | 5,998,019 | 12/1999 | Rosenbaum et al. ........ 428/345 |
| 4,863,996 | 9/1989 | Nakazima et al. | | 6,083,587 | 7/2000 | Smith et al. ............... 428/36.6 |
| 4,871,799 | 10/1989 | Kobayashi et al. | | 6,149,997 | 11/2000 | Patel et al. ............. 428/36.91 |
| 4,873,287 | 10/1989 | Sauers et al. | | 6,168,862 | 1/2001 | Rosenbaum et al. ........ 428/345 |
| 4,877,682 | 10/1989 | Raniere et al. | | 6,261,655 | 7/2001 | Rosenbaum et al. ....... 428/36.7 |
| 4,885,119 | 12/1989 | Mueller et al. | | | | |
| 4,910,085 | 3/1990 | Gogolewski et al. | | | | |
| 4,923,470 | 5/1990 | Dumican | | | | |

FOREIGN PATENT DOCUMENTS

| | | |
|---|---|---|
| DE | 41 42 271 A1 | 6/1993 |
| EP | 92897 | 2/1983 |
| EP | 446505 A1 | 6/1993 |
| FR | 2688511 | 9/1993 |
| GB | 2 177 974 A | 2/1987 |
| WO | WO83/00158 | 1/1983 |
| WO | WO 86/07010 | 12/1986 |
| WO | WO 93 23093 | 11/1993 |

| | | |
|---|---|---|
| 4,929,479 | 5/1990 | Shishido et al. |
| 4,957,966 | 9/1990 | Nishio et al. |
| 4,957,967 | 9/1990 | Mizuno et al. |
| 4,966,795 | 10/1990 | Genske et al. |
| 4,977,213 | 12/1990 | Giroud-Abel et al. |
| 4,996,054 | 2/1991 | Pietsch et al. |
| 5,006,601 | 4/1991 | Lutz et al. |
| 5,017,652 | 5/1991 | Abe et al. |
| 5,034,457 | 7/1991 | Serini et al. |
| 5,034,458 | 7/1991 | Serini et al. |
| 5,053,457 | 10/1991 | Lee |
| 5,071,686 | 12/1991 | Genske et al. |
| 5,071,911 | 12/1991 | Furuta et al. |
| 5,071,912 | 12/1991 | Furuta et al. |
| 5,075,376 | 12/1991 | Furuta et al. |
| 5,079,295 | 1/1992 | Furuta et al. |
| 5,085,649 | 2/1992 | Flynn |
| 5,093,164 | 3/1992 | Bauer et al. |
| 5,093,194 | 3/1992 | Touhsaent et al. |
| 5,094,921 | 3/1992 | Itamura et al. |
| 5,108,844 | 4/1992 | Blemberg et al. |
| 5,110,642 | 5/1992 | Genske |
| 5,116,906 | 5/1992 | Mizuno et al. |
| 5,129,894 | 7/1992 | Sommermeyer et al. |
| 5,132,363 | 7/1992 | Furuta et al. |
| 5,145,731 | 9/1992 | Lund et al. |
| 5,154,979 | 10/1992 | Kerschbaumer et al. |
| 5,159,004 | 10/1992 | Furuta et al. |
| 5,164,267 | 11/1992 | D'Heur et al. |
| 5,176,634 | 1/1993 | Smith et al. |

*Primary Examiner*—Vivian Chen
(74) *Attorney, Agent, or Firm*—Mark J. Buonaiuto; Joseph A. Fuchs (57)  ABSTRACT

The present invention provides a multiple layer thermoplastic structure of a (1) skin layer selected from the group consisting of polypropylene, ethylene homopolymers having a density of from about 0.930 g/cc to about 0.960 g/cc, and ethylene homopolymers having a density of from about 0.930 g/cc to about 0.960 g/cc blended with an ethylene and a-olefin copolymers having a density less than about 0.930 g/cc, the skin layer having a thickness of greater than about 3.0 mils; (2) a radio frequency susceptible layer adhered to the skin layer, the radio frequency susceptible layer having a dielectric loss greater than 0.05 at 1–60 MHz and at temperatures of ambient to 250° C., the radio frequency susceptible layer having: (a) a first polyolefin selected from the group consisting of polypropylene and polypropylene copolymers, (b) a second polyolefin selected from the group consisting of ethylene copolymers, ultra-low density polyethylene, polybutene, and butene ethylene copolymers; (c) a radio frequency susceptible polymer selected from the group consisting of (i) ethylene copolymers having 50–85% ethylene content with comonomers selected from a first group consisting of acrylic acid, methacrylic acid, ester derivatives of acrylic acid with alcohols having 1–10 carbons, ester derivatives of methacrylic acid with alcohols having 1–10 carbons, vinyl acetate, and vinyl alcohol (ii) homopolymers and copolymers containing at least one segment of urethanes, esters, ureas, imides, sulfones, and amides, and (d) a compatibilizing agent of a styrene and hydrocarbon copolymer; wherein the structure when fabricated into a 50 ml container has a water vapor transmission rate of less than 8% by weight after the container has been autoclaved at 121° C. for 20 minutes and stored for 90 days in an environmentally regulated compartment having 15% relative humidity at 40° C.

57 Claims, 6 Drawing Sheets

MULTI-LAYERED POLYMER BASED MOISTURE BARRIER STRUCTURE FOR MEDICAL GRADE PRODUCTS

RELATED APPLICATION

This is a continuation-in-part of U.S. patent application Ser. No. 09/334,957, which was filed on Jun. 17, 1999, U.S. Pat. No. 6,621,655, which is a continuation of U.S. patent application Ser. No. 08/153,602 filed on Nov. 16, 1993, now U.S. Pat. No. 5,998,019. Both of these are incorporated herein by reference and made a part hereof.

TECHNICAL FIELD

The present invention relates generally to materials for making medical grade products and more specifically to a moisture-barrier film product which may be used to manufacture articles such as plastic containers and medical tubing.

BACKGROUND PRIOR ART

In the medical field, where beneficial agents are collected, processed and stored in containers, transported, and ultimately delivered through tubes by infusion to patients to achieve therapeutic effects, materials which are used to fabricate the containers must have a unique combination of properties. For example, in order to visually inspect solutions for particulate contaminants, the container must be optically transparent. To infuse a solution from a container by collapsing the container walls, without introducing air into the container, the material which forms the walls must be sufficiently flexible. The material must be functional over a wide range of temperatures. The material must function at low temperatures by maintaining its flexibility and toughness because some solutions, for example, certain premixed drug solutions are stored and transported in containers at temperatures such as −25 to −30° C. to minimize the drug degradation. The material must also be functional at high temperatures to withstand the heat of sterilization; a process which most medical packages and nutritional products are subjected to prior to shipment. The sterilization process usually includes exposing the container to steam at temperatures typically 121° C. and at elevated pressures. Thus, the material needs to withstand the temperature and pressures without significant distortions ("heat distortion resistance").

For ease of manufacture into useful articles, it is desirable that the material be sealable using radio frequency ("RF") generally at about 27.12 MHz. Therefore, the material should possess sufficient dielectric loss properties to convert the RF energy to thermal energy.

A further requirement is to minimize the environmental impact upon the disposal of the article fabricated from the material after its intended use. For those articles that are disposed of in landfills, it is desirable to use as little material as possible and avoid the incorporation of low molecular weight leachable components to construct the article. Thus, the material should be light weight and have good mechanical strength. Further benefits are realized by using a material which may be recycled by thermoplastically reprocessing the post-consumer article into other useful articles.

For those containers which are disposed of through incineration, it is necessary to use a material which helps to eliminate the dangers of biological hazards, and to minimize or eliminate entirely the formation of inorganic acids which are environmentally harmful, irritating, and corrosive, or other products which are harmful, irritating, or otherwise objectionable upon incineration.

It is also desirable that the material be free from or have a low content of low molecular weight additives such as plasticizers, stabilizers and the like.

Traditional flexible polyvinyl chloride materials meets a number of, and in some cases, most of the above-mentioned requirements. Polyvinyl chloride ("PVC") also offers the distinct advantage of being one of the most cost effective materials for constructing devices which meet the above requirements. However, PVC may generate objectionable amounts of hydrogen chloride (or hydrochloric acid when contacted with water) upon incineration, causing corrosion of the incinerator. PVC sometimes contains plasticizers which may leach into drugs or biological fluids or tissues that come in contact with PVC formulations. Thus, many materials have been devised to replace PVC. However, most alternate materials are too expensive to implement and still do not meet all of the above requirements.

For certain medical products it may be necessary to provide a barrier against the transmission of water to provide a low water vapor transmission rate (WVTR). For example, for a 50 ml flexible diluent container associated with medical reconstitution devices it is desirable that the container be capable of being left outside of an overpouch or overwrap material for a 12 month period without losing 8% of its diluent content to evaporation through the film. While the barrier to water vapor transmission can be enhanced by increasing the thickness of layers that resists water vapor transmission, such an increase in thickness of these barrier materials can render the container too rigid to collapse upon draining or make the container too rigid to easily perform a drug reconstitution procedure.

There have been many attempts to develop a film material to replace PVC, but most attempts have been unsuccessful for one reason or another. For example, in U.S. Pat. No. 4,966,795 which discloses multi-layer film compositions capable of withstanding the steam sterilization, cannot be welded by radio frequency dielectric heating thus cannot be assembled by this rapid, low costs, reliable and practical process. European Application No. EP 0 310 143 A1 discloses multilayer films that meet most of the requirements, and can be RF welded. However, components of the disclosed film are cross-linked by radiation and, therefore, cannot be recycled by the standard thermoplastic processing methods. In addition, due to the irradiation step, appreciable amounts of acetic acid is liberated and trapped in the material. Upon steam sterilization, the acetic acid migrates into the packaging contents as a contaminant and by altering the pH of the contents acts as a potential chemical reactant to the contents or as a catalyst to the degradation of the contents.

The main objective of the present invention is the creation of thermoplastic materials which are, overall, superior to those materials, of which we are aware, which have been heretofore known to the art or have been commercially used or marketed. The properties of such materials includes flexibility, extensibility, and strain recoverability, not just at room temperatures, but through a wide range of ambient and refrigerated temperatures. The material should be steam sterilizable at temperatures typically at 121° C. or slightly above or below. The material should be capable of being subjected to significant strains without exhibiting strain whitening, which can indicate a physical and a cosmetic defect. A further objective is that the material be capable of assembly by the RF methods. Another objective is that the material be substantially free of low molecular weight leachable additives, and be capable of safe disposal by incineration without the generation of significant amounts of corrosive inorganic acids. Another objective is that the material be recyclable by standard thermoplastic processing methods after use. It is also desirable that the material incorporate reground scrap material recovered during the manufacturing process to save material costs and reduce manufacturing waste. It is also desirable that the material have high barrier to water vapor transmission so that the material may be fabricated into fluid containers that do not require the use of an overpouch or overwrap material. It is also desirable that the material not be oriented as oriented films may shrink when subjected to heat. Finally, the material should serve as a cost effective alternative to various PVC formulations currently being used for medical devices.

The present invention is provided to solve these and other problems.

SUMMARY OF THE INVENTION

In accordance with the present invention certain multiple layer polymer based structures are disclosed. The films may be fabricated into medical grade articles such as diluent containers for reconstitution devices.

It is an object of the present invention to prepare a multi-layered film having the following physical properties: (1) a mechanical modulus less than 150,000 psi and more preferably less than 120,000 psi when measured in accordance with ASTM D-882; (2) a content of elemental halogens less than 5 0.1%, and more preferably less than 0.01%, (3) a low molecular weight water soluble fraction less than 0.1%, and more preferably less than 0.005%; (4) a maximum dielectric loss between 1 and 60 MHz and between the temperature range of 25–250° C. greater than or equal to 0.05 and more preferably greater than or equal to 0.1; (5) an autoclave resistance measured by sample creep at 121° C. under 27 psi loading is less than or equal to 60% and more preferably less than or equal to 20%; (6) there is no strain whitening after being strained at moderate speeds of about 20 inches per minute at about 100% elongation and the presence of strain whitening is noted or the lack thereof; (7) has a water vapor transmission rate for a water filled 50 ml container of less than 8%, more preferably less than 7% and most preferably less than 6% by weight when left outside an overpouch for a 12 month period and more preferably a 14 month period and (8) is not oriented.

The present invention provides a multiple layer thermoplastic structure suitable for manufacturing medical products satisfying the above-mentioned physical property requirements. The structure has a skin layer and a radio frequency susceptible layer. The skin layer is selected from the group consisting of polypropylene, ethylene homopolymers having a density from 0.930 g/cc–0.960 g/cc and blends of ethylene homopolymers and ethylene α-olefin copolymers having a density less than about 0.930 g/cc. The radio frequency susceptible layer is adhered to the skin layer and has a dielectric loss greater than 0.05 at 1–60 MHz and at temperatures of ambient to 250° C. The radio frequency susceptible layer comprises, in a preferred form of the invention, a four component blend. The first component is a first polyolefin selected from the group consisting of polypropylene and polypropylene copolymers. The second component is a second polyolefin selected from the group consisting of ethylene copolymers, ethylene and α-olefin copolymers, ultra-low density polyethylene, polybutene, and butene ethylene copolymers. The third component is a radio frequency susceptible polymer selected from the group consisting of ethylene copolymers having 50–85% ethylene content with comonomers selected from a first group consisting of acrylic acid, methacrylic acid, ester derivatives of acrylic acid with alcohols having 1–10 carbons, ester derivatives of methacrylic acid with alcohols having 1–10 carbons, vinyl acetate, carbon monoxide and vinyl alcohol. The RF susceptible polymer may also be selected from a second group consisting of homopolymers and copolymers containing segments of urethane, esters, ureas, imides, sulfones, and amides. These functionalities may constitute between 5–100% of the RF susceptible polymer. The fourth component of the radio frequency susceptible layer is a compatibilizing agent of a styrene and hydrocarbon copolymer.

The present invention further provides intermediate layers to provide additional physical properties such as enhanced lower temperature performance as will be discussed in greater detail below. Also, the present invention provides using a three-component radio frequency susceptible layer.

Additional features and advantages of the present invention are described in, and will be apparent from, the drawing and the detailed description of the presently preferred embodiments.

DETAILED DESCRIPTION

While this invention is susceptible of embodiments in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

According to the present invention, multiple layered film structures are provided which meet the requirements set forth above.

Figure 1:
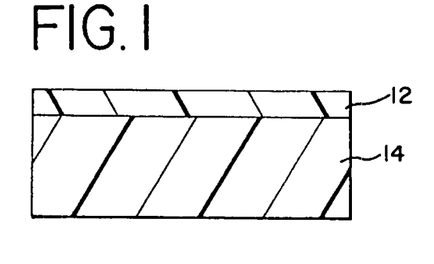
FIG. 1 shows a cross-sectional view of a two layered film structure of the present invention.

FIG. 1 shows a two layered film structure 10 having a skin layer 12 and a radio frequency ("RF") susceptible layer 14. The skin layer 12 confers heat distortion resistance and abrasion resistance and is preferably a polypropylene and more preferably a polypropylene copolymer blended with styrene and hydrocarbon copolymer. The styrene and hydrocarbon copolymer can be a block copolymer including di-block, tri-block, star block, it can also be a random copolymer and other types of styrene and hydrocarbon copolymers that are known by those skilled in the art. In a preferred form of the invention the styrene and hydrocarbon copolymer is a block copolymer of styrene-ethylene-butene-styrene. More preferably, the skin layer 12 is a polypropylene copolymer blended with SEBS block copolymer within a range of 0–20% by weight. The skin layer 12 should have a thickness within the range of 0.2–3.0 mils thick.

The RF susceptible layer 14 of the present invention should have a dielectric loss of greater than 0.05 at frequencies within the range of 1–60 MHz within a temperature range of ambient to 250° C. The RF layer 14 preferably has four components. The RF layer 14 confers RF sealability, flexibility, heat distortion resistance, and compatibility to the film structure 10. The first component of the RF layer 14 is chosen from polypropylene copolymers and preferably the propylene alpha-olefin random copolymers ("PPE"). The PPE's possess the required rigidity and the resistance to yielding at the autoclave temperatures of about 121° C. However, by themselves, the PPE's are too rigid to meet the flexibility requirements. When combined by alloying with certain low modulus polymers, good flexibility can be achieved.

These low modulus copolymers can include ethylene based copolymers such as ethylene-co-vinyl acetate ("EVA"), ethylene co-alpha olefins, or the so-called ultra low density (typically less than 0.90 Kg/L) polyethylenes ("ULDPE"). These ULDPE include those commercially available products sold under the trademarks TAFMER® (Mitsui Petrochemical Co.), AFFINITY VP8770 (Dow Chemical Co.) under the product designation A4085, Exact® (Exxon Chemical Company) under the product designations 4023–4024, and Insite® technology polymers (Dow Chemical Co.). In addition, poly butene-1 ("PB"), such as those sold by Shell Chemical Company under product designations PB-8010, PB-8310; thermoplastic elastomers based on SEBS block copolymers, (Shell Chemical Company), poly isobutene ("PIB") under the product designations Vistanex L-80, L-100, L-120, L-140 (Exxon Chemical Company), ethylene alkyl acrylate, the methyl acrylate copolymers ("EMA") such as those under the product designation EMAC 2707, and DS-1130 (Chevron), and n-butyl acrylates ("ENBA") (Quantum Chemical) were found to be acceptable copolymers. Ethylene copolymers such as the acrylic and methacrylic acid copolymers and their partially neutralized salts and ionomers, such as PRIMACOR® (Dow Chemical Company) and SURYLN® (E.I. DuPont de Nemours & Company) were also acceptable. Typically, ethylene based copolymers have melting point temperatures of less than about 110° C. are not suited for autoclaving at 121° C. applications. Furthermore, only a limited range of proportions of each component allows the simultaneous fulfillment of the flexibility and autoclavability requirements.

Preferably the first component is chosen from the group of polypropylene homo and random copolymers with alpha olefins which constitutes approximately 30–60%, more preferably 35–45%, and most preferably 45%, by weight of the film. For example, random copolymers of propylene and ethylene where the ethylene content is in an amount within the range of 0–6%, and more preferably within the range of 2–6%, of the weight of the propylene is preferred as the first component. The relative comonomer contents herein shall be stated as weight percentages except for ethylene vinyl alcohol copolymers where the relative comononer content is stated as a mole percentage.

The second component of the RF layer 14 confers flexibility and low temperature ductility to the RF layer 14 and is chosen from the group consisting of polyolefins that do not have propylene repeating units ("non propylene based polyolefins") including ethylene copolymers including ULDPE, polybutene, butene ethylene copolymers, ethylene vinyl acetate, copolymers with vinyl acetate contents between approximately 18–50%, ethylene methyl acrylate copolymers with methyl acrylate contents being between approximately 20–40%, ethylene n-butyl acrylate copolymers with n-butyl acrylate content of between 20–40%, ethylene acrylic acid copolymers with the acrylic acid content of greater than approximately 15%. An example of these products are sold under such product designations as Tafmer A-4085 (Mitsui), EMAC DS-1130 (Chevron), Exact 4023, 4024 and 4028 (Exxon). Preferably, the second component is either ULDPE sold by Dow Chemical Co. under the tradename AFFINITY VP 8770, Mitsui Petrochemical Company under the designation TAFMER A-4085, or polybutene-1, PB8010, PB8310 and PB8410 (Shell Chemical Co.), and should constitute approximately 25–50%, more preferably 35–45%, and most preferably 45%, by weight of the film.

The first and second components of the RF layer 14 may be replaced by a single component selected from a high melting temperature and flexible olefins such as those polypropylenes sold by the Huntman Company under the product designation FPO. The melting point temperature of this component should be greater than 130° C. and the modulus less than 20,000 psi. This component should constitute between 30–60% by weight of the RF layer.

To impart RF dielectric loss to the RF layer 14, certain known high dielectric loss ingredients are included as the third component of the film structure 10. For example, EVA and EMA of sufficiently high co-monomer contents exhibit significant dielectric loss properties at 27 MHz to allow the compositions to be sealed by the dielectric process. Polyamides as a class of material, and ethylene vinyl alcohol ("EVOH") copolymers (typically produced by hydrolysing EVA copolymers), both possess high dielectric loss properties at suitable temperatures. Other active materials include PVC, vinylidine chlorides, and fluorides, copolymer of bis-phenol-A and epichlorohydrines known as PHENOXYS® (Union Carbide). However, significant contents of these chlorine and fluorine containing polymers would make them environmentally unsound as incineration of such a material would generate inorganic acids. Therefore, the third component of the RF layer 14 is preferably chosen from the class of polyamides.

Preferably, the polyamides of the present invention will be chosen from aliphatic polyamides resulting from the condensation reaction of diamines having a carbon number within a range of 2–13, aliphatic polyamides resulting from a condensation reaction of di-acids having a carbon number within a range of 2–13, polyamides resulting from the condensation reaction of dimer fatty acids, and amide containing copolymers (random, block or graft).

Polyamides such as nylons are widely used in film material because they offer abrasion resistance to the film. However, typically the nylons not found in the layer which contacts medical solutions as in some instances they can contaminate the solution by leaching out into the solution. However, it has been found by the applicants of the present invention that various dimer fatty acid polyamides sold by, for example, Henkel Corporation under the product designations MACROMELT and VERSAMID do not lead to such significant leachable levels and thus are the most preferred third component of the RF layer 14. The third component should constitute approximately 3–40%, more preferably between 7–13%, and most preferably 10%, by weight of the RF layer 14.

The fourth component of the RF layer 14 confers compatibility between the polar and nonpolar components of the RF layer 14. The fourth component was chosen from styrene-hydrocarbon copolymers and preferably styrene hydrocarbon block copolymers such as SEBS copolymers that are modified by maleic anhydride, epoxy, or carboxylate functionalities. Most preferably the fourth component is an SEBS block copolymer that is maleic anhydride functionalized. Such a product is sold by Shell Chemical Company under product designations KRATON 1901X or 1924X. The fourth component should constitute approximately 5–40%, more preferably 7–13%, and most preferably 10% by weight of the RF layer 14.

It may also be desirable to include a fifth component to the RF layer 14 of an SEBS block copolymer, not modified by the above functional groups, such as the one sold by the Shell Chemical Company under the product designation KRATON G-1652 or G-1657. This component should constitute between 5–40% by weight of the RF Layer, more preferably between 7–13%, and most preferably 10%.

Preferably the RF susceptible layer will have a thickness from about 1–9 mils or more preferably from about 5.0 mils–8.0 mils, and most preferably about 5.0 mils. The skin layer will have a thickness within the range of about 0.2–3.0 mils and most preferably about 0.5 mils.

Figure 2:
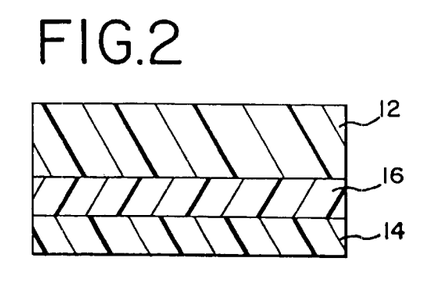
FIG. 2 shows a cross-sectional view of a three layered film structure of the present invention including a core layer added to the film of FIG. 1.

FIG. 2 shows another embodiment of the present invention having a core layer 16 interposed between the skin layer 12 and the RF layer 14. The core layer 16 confers heat distortion resistance, and flexibility to the film structure 10 and compatibility among the components of the film structure 10. Preferably, the core layer will have a thickness within the range of 0.5–10 mils and more preferably 1–4 mils. The core layer 16 includes three components. The first component is a polyolefin and preferably a polypropylene in an amount that constitutes in a range of 20–60% by weight of the core layer 16, more preferably 35–50%, and most preferably 45% of the core layer 16.

The second component of the core layer 16 is chosen from a group consisting of compounds that confer flexibility to the core layer 16 including ULDPE, polybutene copolymers. Preferably, the second component of the core layer is ULDPE or polybutene-1 in an amount by weight of 40%–60%, more preferably 40–50%, and most preferably 40%.

The third component of the core layer 16 is chosen from a group of compounds that confer compatibility among the components of the core layer 16 and includes styrene-hydrocarbon block copolymers and most preferably SEBS block copolymers. The third component is in an amount preferably within a range of 5–40% by weight of the core layer 16, more preferably 7–15%, and most preferably 15%.

It is also possible to add as a fourth component of the core layer 16, reground trim scrap material recovered during the manufacturing of containers. The scrap material is dispersed throughout the core layer 16. Scrap may be added in an amount preferably between approximately 0–50% by weight of the core layer 16, and more preferably within the range of 10–30% and most preferably within the range of 3–12%.

Figure 3:
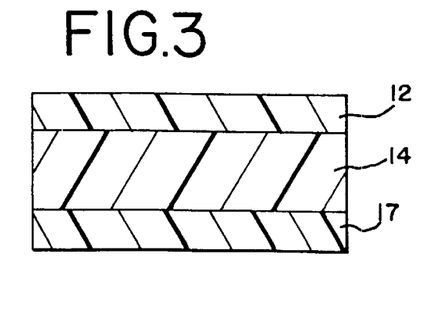
FIG. 3 shows a cross-sectional view of the film of FIG. 1 with a solution contact layer.

FIG. 3 shows the film or sheet structure of FIG. 1 including a solution contact layer 17 adhered to a side of the RF layer opposite the skin layer 12. The solution contact layer 17 includes three components that may be chosen from the same first three components and the same weight percentage ranges of the core layer 16 set forth above. Preferably, the solution contact layer 17 has a thickness from about 0.2–1.0 mils and most preferably about 1.0 mil.

Figure 4:
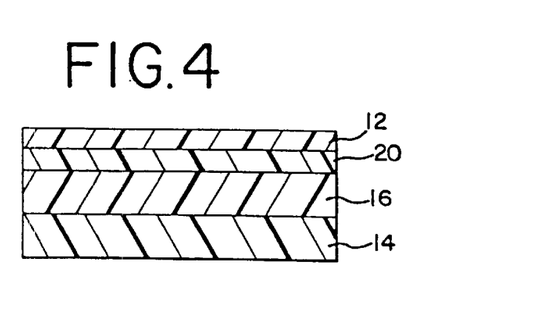
FIG. 4 shows a cross-sectional view of a four layered structure of the present invention having a discrete layer of scrap material between the skin and the core layers.
Figure 5:
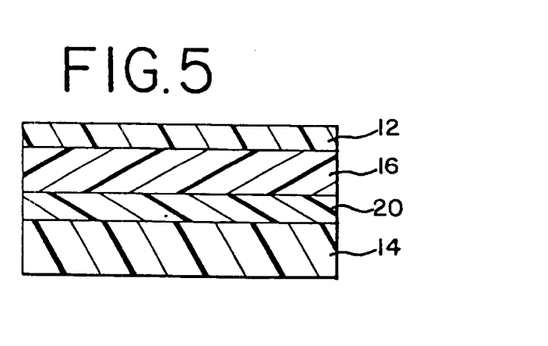
FIG. 5 shows a cross-sectional view of a film structure using reground scrap as a discrete layer between the core and the RF layers.
Figure 6:
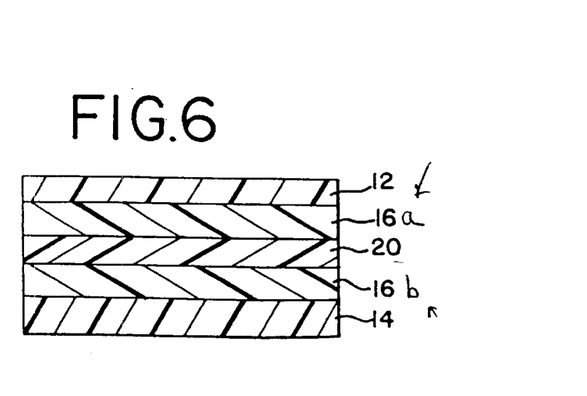
FIG. 6 shows a cross-sectional view of a film structure using reground scrap as a discrete layer which splits the core layer into two core layers.

FIG. 4 shows another embodiment of the multiple layer film structure having the skin layer 12, core layer 16, and RF layer 14 as described above with an additional discrete layer of scrap 20 between the skin layer 12 and the core layer 16. FIG. 5 shows the discrete scrap layer 20 between the core layer 16 and the RF layer 20. FIG. 6 shows the scrap layer 20 dividing the core layer 16 into first and second core layers 16a and 16b. Preferably, the layer of regrind should have a thickness within the range of 0.5–5.0 mils and most preferably 1.0 mils.

Figures 7, 8, 9, 10:
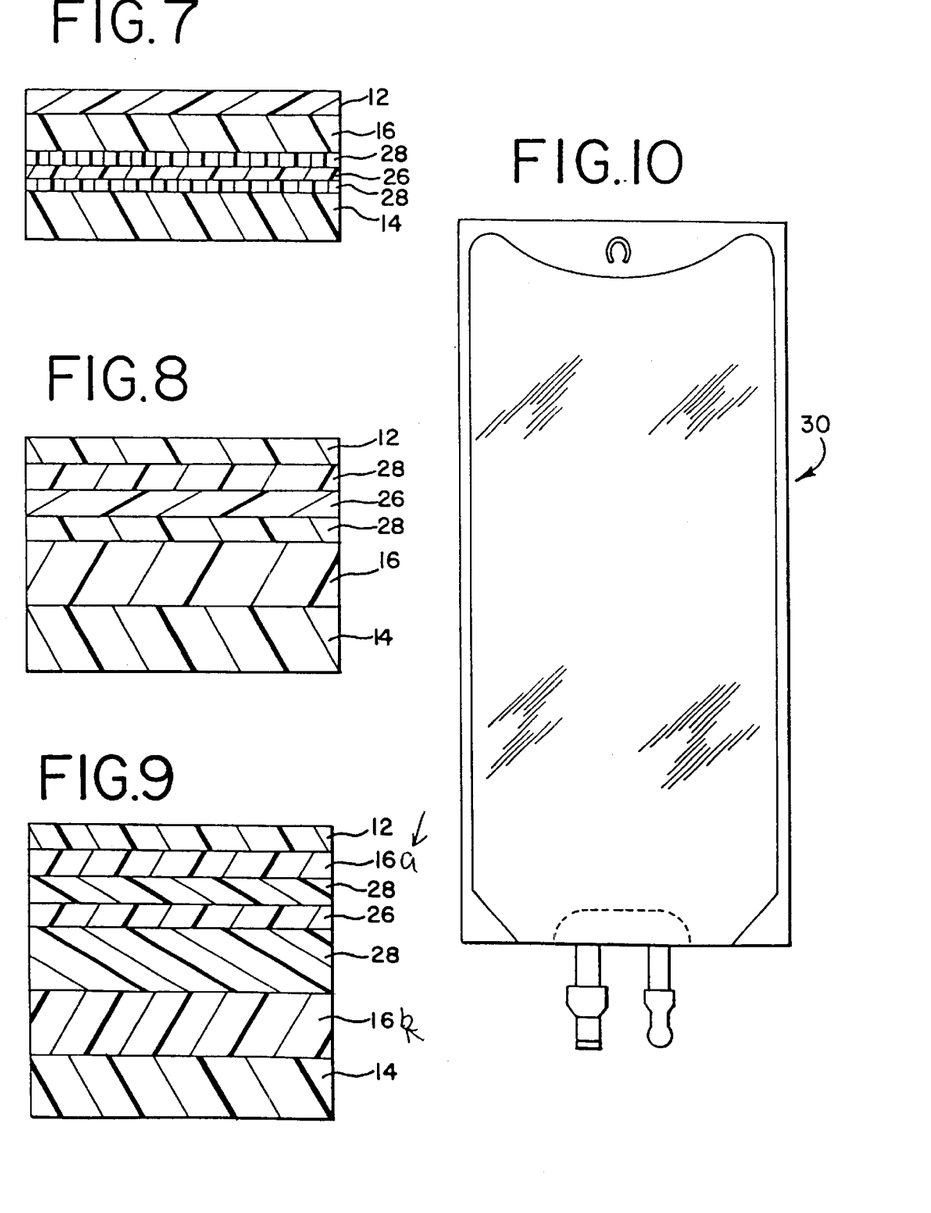
FIG. 7 shows a cross-sectional view of a film structure of the present invention having seven layers including a barrier layer between the core and the RF layers and two tie layers.
FIG. 8 shows the same structure of FIG. 6 except the barrier layer is disposed between the core layer and the skin layers.
FIG. 9 shows a cross-sectional view of a film structure having a barrier layer dividing the core layers.
FIG. 10 shows a container constructed from one of the film structures of the present invention.

FIG. 7 shows another embodiment of the present invention having seven layers including the skin 12, core 16, and RF layers 14 discussed above, with a barrier layer 26 interposed between the core 16 and RF layers 14 and adhered thereto with tie layers 28 attached to opposite sides of the barrier layer 26. FIG. 8 shows the barrier layer 26 between the core layer 16 and the skin layer 12. FIG. 9 shows the barrier layer 26 dividing the core layer 14 into two core layers 14a and 14b. The barrier layer 26 increases the gas barrier properties of the film structure 10. The barrier layer 26 is selected from the group consisting ethylene vinyl alcohols such as that sold under the name Evalca (Evalca Co.), highly glassy or crystalline polyamide such as Sclar PA® (Dupont Chemical Co.), high nitrile content acrylonitrile copolymers such as Barex® (sold by British Petroleum. Preferably, the barrier layer 26 is ethylene vinyl alcohol, and has a thickness within the range of 0.3–1.5 mils and most preferably 1.0 mils.

The tie layers 8 may be selected from modified ethylene and propylene copolymers such as those sold under the product designations Prexar (Quantum Chemical Co.) and Bynel (Dupont) and should have a thickness within the range of 0.2–1.0 mils and most preferably 0.5 mil.

The above layers may be processed by coextrusion, coextrusion coating, or other acceptable process. It should be understood; however, that the method of manufacturing the film structure is not a part of the present invention, and thus the scope of this invention should not be limited to this extent.

These materials may be used to manufacture I.V. therapy bags such as the one shown in FIG. 10 and generally designated as 30.

Figure 11:
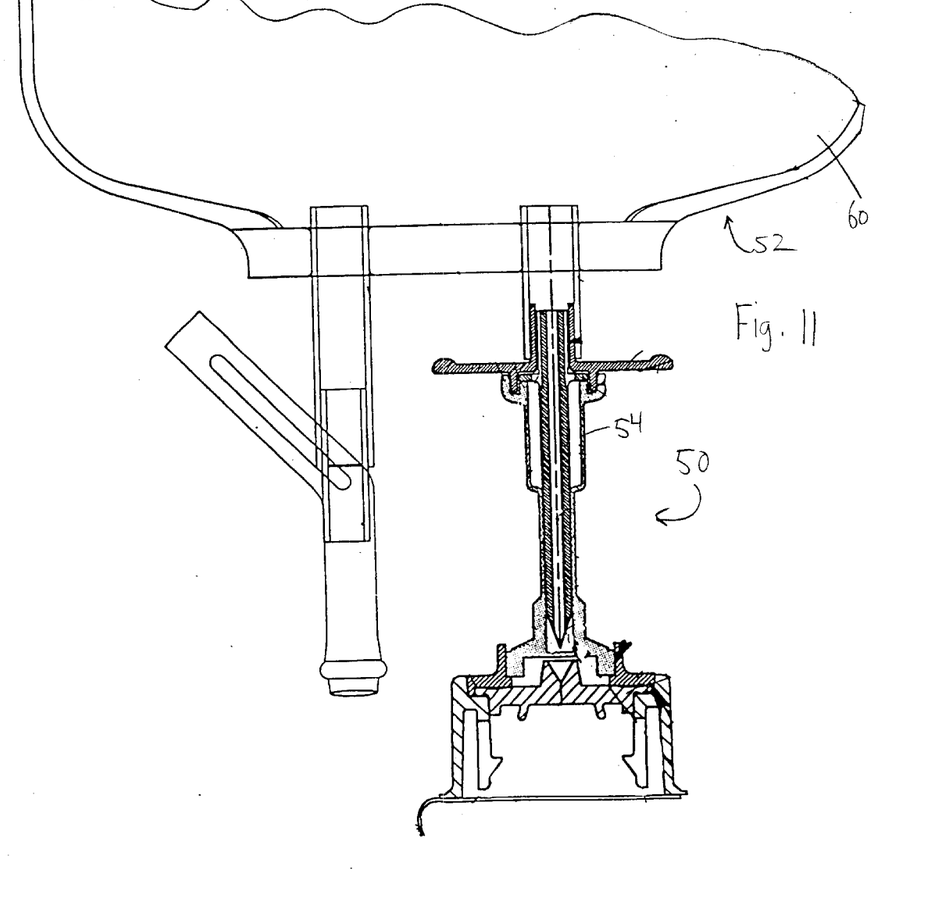
FIG. 11 shows a reconstitution device having a diluent container and a vial containing a powdered drug to be reconstituted.

FIG. 11 shows a drug reconstitution device 50 having a flexible diluent container 52 and a vial access device 54 connecting the container 52 to a drug vial. The diluent container 52 contains water, saline solution or a ringers lactate solution or other solution suitable for reconstituting a drug. The diluent container typically is available in various sizes including 50 ml, 100 ml and 250 ml. The drug vial 56 contains a powdered drug or liquid drug that must be mixed with the diluent before being administered to a patient. The operation of the drug reconstitution device 50 is more fully set forth in U.S. patent application Ser. No. 08/986,580 which is incorporated in its entirety herein by reference and made a part hereof. It has been found the films discussed above have inadequate water vapor barrier properties to provide the diluent container 52 in the 50 ml and 100 ml volume containers.

It is desirable that the container 52 is capable of being shipped and stored without having an additional overwrap or overpouch barrier material. This requires that the container sidewalls 60 be made of a material that has a high barrier to moisture loss. In a preferred form of the invention the sidewalls of a 50 ml container will have a water loss of less than 8% by weight, more preferably less than 7% by weight and most preferably less than 6% by weight after the container has been autoclaved at 121° C. for about 20 minutes and stored for 12 months or more in an environmentally regulated compartment having 35% relative humidity at 25° C. The 50 ml container should also satisfy the same WVTR criteria when an autoclaved container is placed in an environmentally regulated compartment having 15% relative humidity at 40° C. for 90 days.

Figure 12:
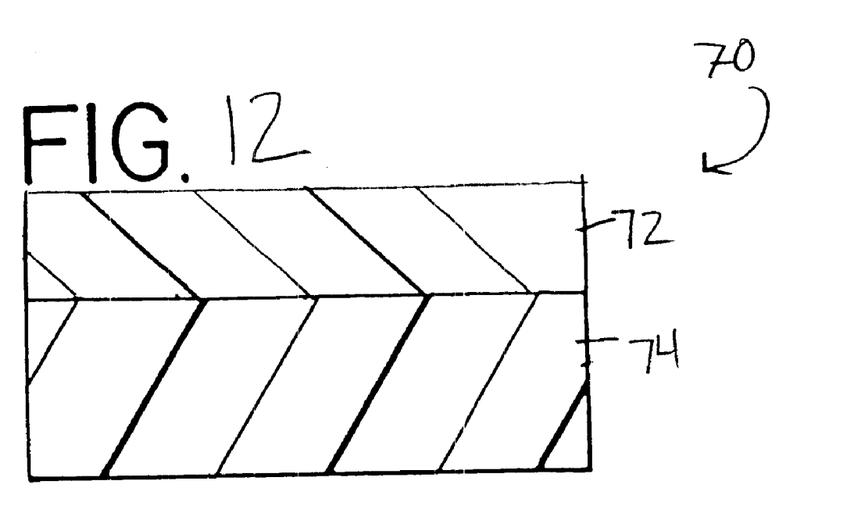
FIG. 12 shows a two-layered water vapor barrier film of the present invention.

FIG. 12 shows a two-layered water barrier film 70 that is suitable for fabricating the diluent container 52. The film 70 has a skin layer 72 and a radio-frequency susceptible layer 74. The skin layer 72 can be selected from polyolefin materials and more preferably from polypropylene polymers and copolymers and ethylene homopolymers and blends of ethylene homopolymers and ethylene and a-olefin copolymers. In a preferred form of the invention, the polypropylene should also be a high molecular weight polymer having a melt flow rate from 0.5–20 g/10 min., more preferably 1–10 g/10 min. and most preferably 1–5 g/10 min. The term "melt flow," "melt flow rate" and "melt flow index" is used herein as the amount, in grams, of a thermoplastic resin which can be forced through a given orifice under a specified pressure and temperature within 10 minutes. The value should be determined in accordance with ASTM D 1238.

Polypropylene copolymers can have ethylene conomoners up to about 3% by weight of the copolymers. Suitable polypropylenes are sold by FINA under the product numbers 6253 and 6671 having melt flows of 1.5 g/10 min. and 11.0 g/10 min. respectively.

Figure 13:
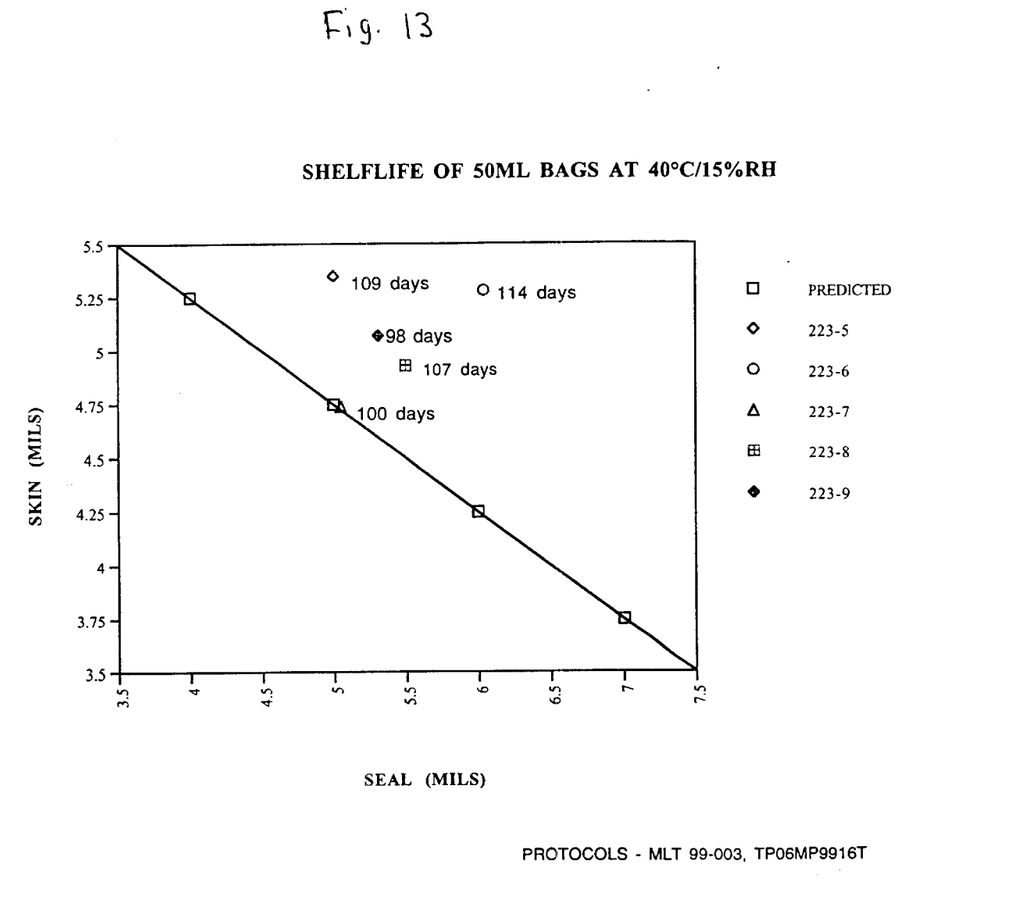
FIG. 13 is a chart relating skin layer thicknesses to seal layer thicknesses to achieve a WVTR within the desired range for one of the films of the present invention.

FIG. 13 shows a graph of the relationship between the thicknesses of the skin layer 72 and the radio-frequency susceptible layer 74 of the film shown in FIG. 12 to achieve the desired WVTR. The desired WVTR can be achieved by having various combination of thicknesses for the skin layer and seal layer (radio frequency susceptible layer). If the plot of the datapoint of the relative thicknesses of the skin layer and seal layer places the datapoint on or above the plotted line then, the resulting 50 ml container or 100 ml containers described immediately above, will have the desired WVTR. For the 50 ml and 100 ml containers set forth above, the skin layer thickness will be greater than 3.0 mils and more preferably at least about 3.5 mils thick and even more preferably from about 3.5 mils to about 8.0 mils. The seal layer should have a thickness from about 3.0 mils to about 8.0 mils.

As set forth above, the skin layer may also be of an ethylene homopolymer such as a high density polyethylene having a density from about 0.930–0.960 g/cc.

In yet another form of the invention, the outer layer can also be a blend of an HDPE and an ethylene and a-olefin copolymer having a density of less than about 0.930 g/cc and more preferably from about 0.900 g/cc to about 0.930 g/cc and preferably is a linear low density polyethylene. The skin layer blend should have by weight from 20–95% HDPE and conversely by weight from 5% to about 80% LLDPE and more preferably from 25–45% HDPE and from 55–75% LLDPE, and most preferably 30% HDPE and 70% LLDPE.

The radio frequency susceptible layer can be selected from those three, four and five component blends set forth above and most preferably is a four-component blend having in amount by weight of 40% polypropylene, 40% ULDPE, 10% SEBS and 10% dimer fatty acid polyamide.

Figure 14:
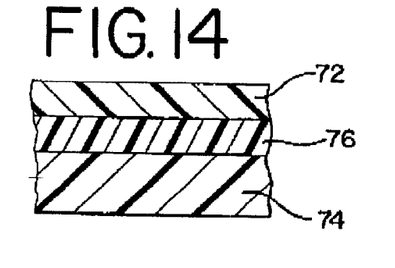
FIG. 14 shows an embodiment of a three-layered water vapor barrier film of the present invention.

FIG. 14 shows a three-layered water vapor barrier film having a skin layer 72 a radio frequency susceptible layer 74 and an intermediate layer 76. The skin layer 72 and radio frequency susceptible layer 74 can be selected from the same materials as set forth above for the two-layered film shown in FIG. 12. The intermediate layer 76 enhances the low temperature performance of the film 70 and in a preferred form of the invention is a polyolefin material and more preferably a polypropylene blended with an elastomer. Suitable polypropylenes for the intermediate layer 76 are those having a melt flow rate from 0.5–20 g/10 min., more preferably 1–10 g/10 min. and most preferably 1–5 g/10 min. Suitable elastomers include styrene and hydrocarbon copolymers and particularly diblock, triblock and star block copolymers, ethylene-propylene rubbers, ethylene propylene diene monomers, ultra-low density polyethylenes, and very-low density polyethylenes. Preferably the intermediate layer has by weight from about 70% to about 99% polypropylene and from about 1% to about 30% elastomer.

In a preferred form of the invention the skin layer has a thickness from about 2 mils to about 4 mils, the intermediate layer has a thickness from about 2 mils to about 4 mils and the radio frequency susceptible layer has a thickness from about 3 mils to about 7 mils.

Figure 15:
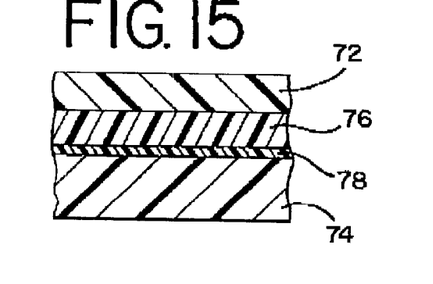
FIG. 15 shows another embodiment of a four-layered water vapor barrier film of the present invention.

FIG. 15 shows a four-layered water vapor barrier film having a radio frequency susceptible layer 74 and a skin layer 72 and two intermediate layers 76 and 78. The skin layer 72 may be selected from the same materials set forth above for the skin layer of the two-layered film shown in FIG. 12 and most preferably is a high molecular weight polypropylene. The radio frequency susceptible layer can also be selected from the same materials set forth above for the radio frequency susceptible layer for the two-layered film shown in FIG. 12. The first intermediate layer 76 preferably is an ethylene and α-olefin copolymer having a density of from about 0.900 g/cc to about 0.930 g/cc. The second intermediate layer 78 is a tie layer for adhering the LLDPE layer 76 to the radio frequency susceptible layer 74. In a preferred form the tie layer 76 is a modified ethylene and propylene copolymers such as those sold under the product designations Prexar (Quantum Chemical Co.) and Bynel (Dupont) and should have a thickness within the range of 0.2–2.0 mils and most preferably 0.5 mil.

In a preferred form of the invention the skin layer 72 has a thickness from about 1 mil to about 4 mils and more preferably from about 1 mil to about 3 mils, the first intermediate layer 76 has a thickness from about 2 mils to about 4 mils and more preferably from 2 mils to about 3 mils, the tie layer 78 should have a thickness from 0.2–2.0 mils and more preferably 0.5 mils and the radio frequency susceptible layer has a thickness from about 3 mils to about 7 mils.

The barrier films of FIGS. 11, 12, 14 and 15 have sufficient flexibility to serve as a container for a reconstitution device. By sufficient flexibility it is meant to have a modulus of elasticity of less than 150,000 psi and more preferably less than 120,000 psi and most preferably less than 100,000 psi. These barrier films also have a WVTR where a 50 ml container when stored in an environmentally regulated compartment having 35% relative humidity at 25° C. for 12 months or longer and when placed in an environmentally regulated compartment having 15% relative humidity at 40° C. for 90 days the container loses less than 8%, more preferably less than 7% and most preferably less than 6% by weight of the contained water. The barrier films also have a content of elemental halogens less than 0.1%, and more preferably less than 0.01%, a low molecular weight water soluble fraction of less than 0.1%, and more preferably less than 0.01% and most preferably less than 0.005%, a maximum dielectric loss between 1 and 60 MHz and between the temperature range of 25–250° C. of greater than or equal to 0.05 and more preferably greater than or equal to 0.1, an autoclave resistance measured by sample creep at 121° C. under 27 psi loading is less than or equal to 60% and more preferably less than or equal to 20%, and the material does not strain whiten after being strained at moderate speeds of about 20 inches per minute at about 100% elongation.

Barrier films of the present invention were tested in accordance with the following procedures.

(1) Autoclavability

Autoclave resistance is measured by sample creep, or the increase in the sample length, at 121° C. under 27 psi loading for one hour. The autoclave resistance must be less than or equal to 60%.

(2) RF Processibility

Containers of 50 ml volumes are sealed on a commercial scale RF sealing equipment sold by Kiefel at 12 kilowatts for a cycle time of about 5–6 seconds. The containers are filled with water and autoclaved at about 121° C. for about 20 minutes. The autoclaved containers are squeezed with 20 psi pressure for about 10 seconds and checked for leakage.

(3) Strain Whitening

Film cut into about a ½ inch strip and stretched on an Instron machine to 100% elongation at 20 inches/minute and the stretched strip is observed for the presence of strain whitening.

(4) Environmental Compatibility

The environmental compatibility comprises three important properties: (a) the material is free of low molecular weight plasticizers which could leach into landfills upon disposal, (2) the material can be thermoplastically recycled into useful items upon fulfilling the primary purpose of medical delivery, and (3) when disposed of by energy reclaim by incineration, no significant inorganic acids are released to harm the environment. ("Envir."). The composition will also contain less than 0.1% halogens by weight. In order to facilitate recycling by melt processing, the resultant composition should have a loss tangent greater than 1.0 at 1 Hz measured at processing temperatures.

(5) Solution Compatibility

By solution compatibility we mean that a solution contained within the film is not contaminated by components which constitute the composition. ("S.Comp."). The low molecular weight water soluble fraction of the composition will be less than 0.1%.

(6) Barrier Properties

The barrier properties are tested by measuring the WVTR of containers subjected to two different sets of environmental conditions. The containers are 50 ml containers and have sidewall thicknesses from 9–12 mils. Each container is filled with about 53–55 ml of water. Each container is autoclaved at 121° C. for about 20 minutes. One container is placed in an environmentally regulated compartment having 35% relative humidity at 25° C. and the weight loss is monitored over time. A second container is placed in an environmentally regulated compartment having 15% relative humidity at 40° C. for and is monitored for weight loss. The percentage of water loss is measured based upon a plot of the weight loss over time.

(7) Not Oriented

What is meant by the term "oriented" is a process of stretching a material in a non-molten state either in a single direction or in more than one direction to align a portion of the molecules of the material in the direction stretched. The film of the present invention is fabricated in an extrusion process that does not have an orientation step after the film exits the extruder and has solidified.

EXAMPLES

Two-layered barrier films of the present invention were fabricated and tested to determine the WVTR of the container. In particular two layer films having skin layer and seal layer thicknesses as set forth in Table 1 below. The skin layers were fabricated from polypropylene (Fina 6253) and the seal layer was fabricated from a four component blend of polypropylene, ultra-low density polyethylene, dimer fatty acid polyamide and styrene-ethylene-butene-styrene block copolymer. The films were fabricated by coextrusion.

The films were fabricated into 50 ml containers by placing two sheets of film into registration and sealed using radio frequency energy to form a container having a fill port. The containers had a surface area of about 23 square inches. Each container was then filled through the fill port with about 53 ml of water. The containers were steam sterilized in an autoclave at about 121° C. for 20 minutes. The containers were removed from the autoclave and placed in a container having a relative humidity of 15% and a temperature of 40° C. The rate of water loss was measured in grams/day as reported in Table 1. The time for each container to lose 6% of its water weight calculated based upon a plot of the water loss vs. time. A plot of these data is shown in FIG. 13.

TABLE 1

| Sample No. | Seal layer thickness | Skin layer thickness | Average measured water loss (G/day) | Number of days to lose 6% of weight of water (Calculated) |
|---|---|---|---|---|
| 223-5 | 5.0 mils | 5.35 mils | 0.0285 | 109 days |
| 223-6 | 6.0 mils | 5.30 mils | 0.0272 | 114 days |
| 223-7 | 5.0 mils | 4.75 mils | 0.0305 | 100 days |
| 223-8 | 5.5 mils | 5.0 mils | 0.0286 | 107 days |
| 223-9 | 5.4 mils | 5.15 mils | 0.029 | 98 days |

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A multiple layer thermoplastic structure:
   (1) a skin layer selected from the group consisting of polypropylene, ethylene homopolymers having a density of from about 0.930 g/cc to about 0.960 g/cc, and ethylene homopolymers having a density of from about 0.930 g/cc to about 0.960 g/cc blended with an ethylene and α-olefin copolymer having a density less than about 0.930 g/cc, the skin layer having a thickness of greater than about 3.0 mils;

(2) a radio frequency susceptible layer adhered to the skin layer, the radio frequency susceptible layer having a dielectric loss greater than 0.05 at 1–60 MHz and at temperatures of ambient to 250° C., the radio frequency susceptible layer having:
   (a) a first polyolefin selected from the group consisting of polypropylene and polypropylene copolymers,
   (b) a second polyolefin selected from the group consisting of ethylene copolymers, ultra-low density polyethylene, polybutene, and butene ethylene copolymers;
   (c) a radio frequency susceptible polymer selected from the group consisting of (i) ethylene copolymers having 50–85% ethylene content with comonomers selected from a first group consisting of acrylic acid, methacrylic acid, ester derivatives of acrylic acid with alcohols having 1–10 carbons, ester derivatives of methacrylic acid with alcohols having 1–10 carbons, vinyl acetate, and vinyl alcohol (ii) homopolymers and copolymers containing at least one segment of urethanes, esters, ureas, imides, sulfones, and amides, and
   (d) a compatibilizing agent of a styrene and hydrocarbon copolymer;

wherein the structure when fabricated into a 50 ml container has a water vapor transmission rate of less than 8% by weight after the container has been autoclaved at 121° C. for 20 minutes and stored for 90 days in an environmentally regulated compartment having 15% relative humidity at 40° C.

2. The structure of claim 1 wherein the styrene and hydrocarbon copolymer is a block copolymer selected from a diblock, triblock or star block copolymers.

3. The structure of claim 2 wherein the block copolymer is selected from a group consisting of a first styrene-ethylene-butene-styrene block copolymer, and a maleic anhydride functionalized styrene-ethylene-butene-styrene block copolymer.

4. The structure of claim 1 wherein the skin layer is a polypropylene having a melt flow rate of 0.5–20 g/10 min.

5. The structure of claim 1 wherein the skin layer is a high density polyethylene.

6. The structure of claim 1 wherein the skin layer is a blend of high density polyethylene and a linear low density polyethylene.

7. The structure of claim 6 wherein the skin layer comprises by weight of the skin layer from about 25% to about 95% high density polyethylene and from 5% to about 75% linear low density polyethylene.

8. The structure of claim 7 wherein the skin layer is 30% by weight high density polyethylene and 70% linear low density polyethylene.

9. The structure of claim 1 wherein the skin layer has thickness from about 3.5 mils to about 8.0 mils and the radio frequency susceptible layer has a thickness from about 3.0 mils to about 8.0 mils.

10. The structure of claim 1 wherein the structure is not oriented.

11. The structure of claim 1 further comprising:
   a first intermediate layer disposed between the skin layer and the radio frequency susceptible layer, the first intermediate layer being selected from the group consisting of (1) a polypropylene blended with an elastomer and (2) an ethylene and α-olefin copolymer having a density of from about 0.900 g/cc to about 0.930 g/cc.

12. The structure of claim 11 wherein the elastomer is selected from the group consisting of styrene and hydrocarbon copolymers, ethylene-propylene rubbers, ethylene propylene diene monomers, ultra-low density polyethylenes, and very-low density polyethylenes.

13. The structure of claim 12 wherein the first intermediate layer comprises by weight from about 99% to about 70% polypropylene and from about 1% to about 30% of the elastomer.

14. The structure of claim 13 wherein the first intermediate layer is 75% polypropylene and 25% SEBS.

15. The structure of claim 12 wherein the first intermediate layer is a linear low density polyethylene.

16. The structure of claim 15 further comprising a second intermediate layer attached to the first intermediate layer.

17. The structure of claim 16 wherein the second intermediate layer is a tie layer.

18. The structure of claim 17 wherein the tie layer is a modified ethylene and propylene copolymer.

19. The structure of claim 1 wherein the structure when fabricated into a 50 ml container has a water vapor transmission rate of less than 8% by weight after the container has been autoclaved at 121° C. for 30 minutes and stored for 90 days in an environmentally regulated compartment having 15% relative humidity at 40° C.

20. A multiple layer thermoplastic structure suitable for manufacturing medical products, the structure comprising:
(1) a skin layer selected from the group consisting of polypropylene, ethylene homopolymers having a density of from about 0.930 g/cc to about 0.960 g/cc, and ethylene homopolymers having a density of from about 0.930 g/cc to about 0.960 g/cc blended with an ethylene and α-olefin copolymers having a density less than about 0.930 g/cc, and the skin layer having a thickness greater than about 3.0 mils; and
(2) a radio frequency susceptible layer adhered to the skin layer, the radio frequency susceptible layer having a dielectric loss greater than 0.05 at 1–60 MHz and at temperatures of ambient to 250° C. and comprising:
   (a) a first polyolefin in an amount in a range of 30–60% by weight of the radio frequency susceptible layer and selected from the group consisting of polypropylene and polypropylene copolymers,
   (b) a second polyolefin in an amount within the range of 25–50% by weight of the radio frequency susceptible layer selected from the group consisting of ethylene copolymers, ultra-low density polyethylene, polybutene, and butene ethylene copolymers;
   (c) a radio frequency susceptible polymer in an amount within the range of 3–40% by weight of the radio frequency susceptible layer selected from the group consisting of (i) ethylene copolymers having 50–85% ethylene content with comonomers selected from a first group consisting of acrylic acid, methacrylic acid, ester derivatives of acrylic acid with alcohols having 1–10 carbons, ester derivatives of methacrylic acid with alcohols having 1–10 carbons, vinyl acetate, and vinyl alcohol (ii) homopolymers and copolymers containing at least one segment of urethanes, esters, ureas, imides, sulfones, and amides; and (d) a compatibilizing agent of a styrene and hydrocarbon copolymer in an amount within the range of 5–40% by weight of the radio frequency susceptible layer, and wherein the structure when fabricated into a 50 ml container has a water vapor transmission rate of less than 8% by weight after the container has been autoclaved at 121° C. for 20 minutes and stored for 90 days in an environmentally regulated compartment having 15% relative humidity at 40° C.

21. The structure of claim 20 wherein the styrene and hydrocarbon copolymer is a block copolymer selected from a diblock, triblock or star block copolymers.

22. The structure of claim 21 wherein the block copolymer is selected from a group consisting of a first styrene-ethylene-butene-styrene block copolymer, and a maleic anhydride functionalized styrene-ethylene-butene-styrene block copolymer.

23. The structure of claim 20 wherein the skin layer is a polypropylene having a melt flow rate of 0.5–20 g/10 min.

24. The structure of claim 20 wherein the skin layer is a high density polyethylene.

25. The structure of claim 20 wherein the skin layer is a blend of high density polyethylene and a linear low density polyethylene.

26. The structure of claim 25 wherein the skin layer comprises by weight of the skin layer from about 25% to about 95% high density polyethylene and from 5% to about 75% linear low density polyethylene.

27. The structure of claim 26 wherein the skin layer is 30% by weight high density polyethylene and 70% linear low density polyethylene.

28. The structure of claim 20 wherein the skin layer has thickness from about 3.5 mils to about 8.0 mils and the radio frequency susceptible layer has a thickness from about 3.0 mils to about 8.0 mils.

29. The structure of claim 20 wherein the structure is not oriented.

30. The structure of claim 20 further comprising:
a first intermediate layer disposed between the skin layer and the radio frequency susceptible layer, the first intermediate layer being selected from the group consisting of (1) a polypropylene blended with an elastomer and (2) an ethylene and α-olefin copolymer having a density of from about 0.900 g/cc to about 0.930 g/cc.

31. The structure of claim 30 wherein the elastomer is selected from the group consisting of styrene and hydrocarbon copolymers, ethylene-propylene rubbers, ethylene propylene diene monomers, ultra-low density polyethylenes, and very-low density polyethylenes.

32. The structure of claim 31 wherein the first intermediate layer comprises by weight from about 99% to about 70% polypropylene and from about 1% to about 30% of the elastomer.

33. The structure of claim 32 wherein the first intermediate layer is about 75% polypropylene and about 25% SEBS.

34. The structure of claim 31 wherein the first intermediate layer is a linear low density polyethylene.

35. The structure of claim 34 further comprising a second intermediate layer attached to the first intermediate layer.

36. The structure of claim 35 wherein the second intermediate layer is a tie layer.

37. The structure of claim 36 wherein the tie layer is a modified ethylene and propylene copolymer.

38. The structure of claim 37 wherein the structure when fabricated into a 50 ml container has a water vapor transmission rate of less than 6% by weight after the container has been autoclaved at 121° C. for 20 minutes and stored for 90 days in an environmentally regulated compartment having 15% relative humidity at 40° C.

39. A multiple layer thermoplastic structure suitable for manufacturing 20 medical products comprising:
(1) a skin layer selected from the group consisting of polypropylene, ethylene homopolymers having a density of from about 0.930 g/cc to about 0.960 g/cc, and ethylene homopolymers having a density of from about 0.930 g/cc to about 0.960 g/cc blended with an ethylene and α-olefin copolymers having a density less than about 0.930 g/cc;
(2) a radio frequency susceptible layer adhered to the skin layer comprising:
(a) a polypropylene having a melting point temperature greater than 130° C. and a modulus less than 20,000 psi in an amount in a range of 30–60% of the weight of the radio frequency susceptible layer,
(b) a radio frequency susceptible polymer in an amount within the range of 3–40% by weight of the radio frequency susceptible layer and selected from the group consisting of (i) ethylene copolymers having 50–85% ethylene content with comonomers selected from a first group consisting of acrylic acid, methacrylic acid, ester derivatives of acrylic acid with alcohols having 1–10 carbons, ester derivatives of methacrylic acid with alcohols having 1–10 carbons, vinyl acetate, and vinyl alcohol (ii) homopolymers and copolymers containing at least one segment of urethanes, esters, ureas, imides, sulfones, and amides,
(c) a first compatibilizing agent of a styrene and hydrocarbon copolymer in an amount within the range of 5–20% by weight of the radio frequency susceptible layer,
(d) wherein the radio frequency susceptible layer having a dielectric loss greater than 0.05 at 1–60 MHz and at temperatures of ambient to 250° C.; and
(3) wherein the structure when fabricated into a 50 ml container has a water vapor transmission rate of less than 8% by weight after the container has been autoclaved at 121° C. for 20 minutes and stored for 90 days in an environmentally regulated compartment having 15% relative humidity at 40° C.

40. The structure of claim 39 wherein the styrene and hydrocarbon copolymer is a block copolymer selected from a diblock, triblock or star block copolymers.

41. The structure of claim 40 wherein the block copolymer is selected from a group consisting of a first styrene-ethylene-butene-styrene block copolymer, and a maleic anhydride functionalized styrene-ethylene-butene-styrene block copolymer.

42. The structure of claim 39 wherein the skin layer is a polypropylene having a melt flow rate of 0.5–20 g/10 min.

43. The structure of claim 39 wherein the skin layer is a high density polyethylene.

44. The structure of claim 39 wherein the skin layer is a blend of high density polyethylene and a linear low density polyethylene.

45. The structure of claim 44 wherein the skin layer comprises by weight of the skin layer from about 25% to about 95% high density polyethylene and from 5% to about 75% linear low density polyethylene.

46. The structure of claim 45 wherein the skin layer is 30% by weight high density polyethylene and 70% linear low density polyethylene.

47. The structure of claim 39 wherein the skin layer has thickness from about 3.5 mils to about 8.0 mils and the radio frequency susceptible layer has a thickness from about 3.0 mils to about 8.0 mils.

48. The structure of claim 39 wherein the structure is not oriented.

49. The structure of claim 39 further comprising:

a first intermediate layer disposed between the skin layer and the radio frequency susceptible layer, the first intermediate layer being selected from the group consisting of (1) a polypropylene blended with an elastomer and (2) an ethylene and α-olefin copolymer having a density of from about 0.900 g/cc to about 0.930 g/cc.

50. The structure of claim 49 wherein the elastomer is selected from the group consisting of styrene and hydrocarbon copolymers, ethylene-propylene rubbers, ethylene propylene diene monomers, ultra-low density polyethylenes, and very-low density polyethylenes.

51. The structure of claim 50 wherein the first intermediate layer comprises by weight from about 99% to about 70% polypropylene and from about 1% to about 30% of the elastomer.

52. The structure of claim 51 wherein the first intermediate layer is about 75% polypropylene and 25% SEBS.

53. The structure of claim 50 wherein the first intermediate layer is a linear low density polyethylene.

54. The structure of claim 53 further comprising a second intermediate layer attached to the first intermediate layer.

55. The structure of claim 54 wherein the second intermediate layer is a tie layer.

56. The structure of claim 55 wherein the tie layer is a modified ethylene and propylene copolymer.

57. The structure of claim 39 wherein the structure when fabricated into a 50 ml container has a water vapor transmission rate of less than 6% by weight after the container has been autoclaved at 121° C. for 30 minutes and stored for 90 days in an environmentally regulated compartment having 15% relative humidity at 40° C.

* * * * *